United States Patent [19]

Hong

[11] Patent Number: 5,606,490

[45] Date of Patent: Feb. 25, 1997

[54] CURRENT LIMITER FOR VOLTAGE/FREQUENCY TYPE INVERTER

[75] Inventor: Bok-young Hong, Seoul, Rep. of Korea

[73] Assignee: Samsung Aerospace Industries, Ltd., Kyongsangnam-dong, Rep. of Korea

[21] Appl. No.: 512,934

[22] Filed: Aug. 9, 1995

[30] Foreign Application Priority Data

Aug. 10, 1994 [KR] Rep. of Korea ................ 94-20211

[51] Int. Cl.[6] .................................................. H02H 7/122
[52] U.S. Cl. ....................................... 363/56; 323/908
[58] Field of Search ........................ 363/17, 98, 55, 363/56, 132; 323/908; 318/434, 452, 455, 484

[56] References Cited

U.S. PATENT DOCUMENTS

| | | | |
|---|---|---|---|
| 3,808,481 | 4/1974 | Rippel | 318/138 |
| 3,983,486 | 9/1976 | Maitrias | 318/318 |
| 4,748,532 | 5/1988 | Commander et al. | 363/89 |
| 5,382,890 | 1/1995 | Moh et al. | 318/254 |
| 5,457,364 | 10/1995 | Bilotti et al. | 363/56 |

Primary Examiner—Matthew V. Nguyen
Attorney, Agent, or Firm—Finnegan, Henderson, Farabow, Garrett & Dunner, L.L.P.

[57] ABSTRACT

A current limiter of a voltage/frequency type inverter which comprises a comparator for comparing an output current to an applied reference value to generate a current comparator output signal; a delay circuit, coupled to the comparator, for delaying the timing of the current comparator output signal for a predetermined time duration to generate a current limiting signal based on the result of the comparison; and a pulse output circuit for outputting a predetermined pulse based on the current limiting signal.

10 Claims, 2 Drawing Sheets

CURRENT LIMITER FOR VOLTAGE/FREQUENCY TYPE INVERTER

BACKGROUND OF THE INVENTION

The present invention relates to a current limiter of an inverter, and more particularly, to a current limiter for a voltage/frequency (V/F) type inverter (DC-to-AC converter) where continuous and reliable operation is guaranteed by blocking the output of the inverter for a predetermined time when too much current is generated for a rotary speed control system of a motor adopting a V/F type inverter.

The speed of an induction motor is expressed as $N=N_s(1-s)$ where $N_s$ is synchronization speed defined as $N_s=120 \, f/p$. Thus, one of three variables, i.e., slip (s), frequency (f) or the number of poles (p), should be varied to control the speed. Here, the most efficient method is to vary the frequency. Also, generally, a voltage is proportionately varied together with the frequency to maintain a proper torque and a high efficiency when the frequency is varied. This is called a V/F method where the voltage is output in direct proportion to the frequency corresponding to the intended speed. Nowadays, the speed of an induction motor is controlled by adopting this method. This method is widely used since this system is easily obtained and operated by a user.

The induction motor induces a magnetic flux between a stator and a rotor according to the variations of voltage and/or current in a winding of the stator. Thus, unlike the case of a DC motor or AC synchronous motor, the strength of the magnetic flux is not constant in an induction motor. The operational characteristics are therefore complex. Also, it is difficult to maintain a constant level of the magnetic flux. On the other hand, the strength of the magnetic flux is approximately proportional to the ratio (V/F) of the output voltage to frequency. Thus, when the frequency is constant, a constant magnetic flux is generated so that the same torque characteristic as that of a DC motor or AC synchronous motor can be obtained. That is, the output frequency is determined with respect to an intended speed of the motor, based on such motor parameters as the number of poles and the like. Hence, a voltage proportional to the output frequency is applied to the motor. However, since the voltage and frequency are constantly maintained, a pulse width modulation (PWM) type inverter for converting the constant voltage and frequency into a variable voltage and a variable frequency has been widely used. This PWM method for applying the output voltage by converting the strength of the output voltage into a pulse width corresponding thereto is necessary for preventing the over-heating of a power transistor which leads to diminished gain.

FIG. 1 is a model circuit diagram of a single phase circuit approximated in a normal operation state, in the conventional three-phase induction motor.

As shown in FIG. 1, an output current Ii flowing in the circuit by a stator voltage Vs applied to the motor is a function of a resistance R, an induction L and a slip S. Here, $R_s$ represents resistance of a stator, $R_L$ represents resistance of a rotator, $L_s1$ represents leakage induction of the stator, $L_r1$ represents leakage inductance of the rotator, M represents a mutual inductance, and S represents the slip. On the other hand, since slip S is varied according to the load state and a rotary speed, output current Ii cannot be freely controlled in the V/F method. However, the power devices used in the inverter, such as a power transistor, power metal oxide semiconductor field-effect transistor (MOSFET) or the like, are sensitive to the current value so that a predetermined current limitation is provided on the output current. That is, when the output current is over the allowable range of the switching device according to the operation state or load state, the switching device is damaged. Therefore, in order to prevent such damage, the motor should be stopped by blocking the current supplied to the motor which is above a predetermined reference value.

However, many problems are also caused by blocking the current output. For example, a user may attempt to operate the motor when the motor stops. Also, to keep the motor from stopping due to the over-current generated during a sudden acceleration, the user has to manually adjust acceleration time through trial and error. In the V/F method, for protecting the motor from damage, since the operation of the inverter cannot be continuously operated due to the blocking of the over-current, there is difficulty in the operation of the peripheral systems of the induction motor. Further, the V/F method is complicated in practical application.

SUMMARY OF THE INVENTION

To solve the above problems, it is an object of the present invention to provide a current limiter for a voltage/frequency type inverter in which continuous and reliable operation is guaranteed by blocking the output of the inverter for a predetermined period of time when the operation of the voltage/frequency inverter is stopped due to output current being over a maximum value.

To achieve the above object, according to one aspect of the present invention, a current limiter of a V/F type inverter, as embodied and broadly described herein, comprises a comparator for comparing an output current to an applied reference value to generate a current comparator output signal; a delay circuit, coupled to the comparator, for delaying the timing of the current comparator output signal for a predetermined time duration to generate a current limiting signal based on the result of the comparison; and a pulse output circuit for outputting a predetermined pulse based on the current limiting signal.

According to another aspect of the present invention, a current limiter of a V/F type inverter comprises a comparator for comparing an output current to a reference current derived from an applied voltage reference value to generate a current comparator output signal having an ON or OFF state; a delay circuit for delaying the timing of the current comparator output signal when the current comparator output signal changes from the OFF state to the ON state, and immediately outputting without delaying the current comparator output signal when the current comparator output signal changes from the ON state to the OFF state to generate a current limiting signal; and a pulse output circuit for outputting a predetermined pulse based on the current limiting signal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In the current limiter of a V/F type inverter according to an embodiment of the present invention, after an output current is compared with a reference value by a comparator, the current value is temporarily decreased during a predetermined time in all ON delay circuit and then an ON or OFF pulse is applied so that the current value is increased and the motor can be continuously operated.

Figure 2:
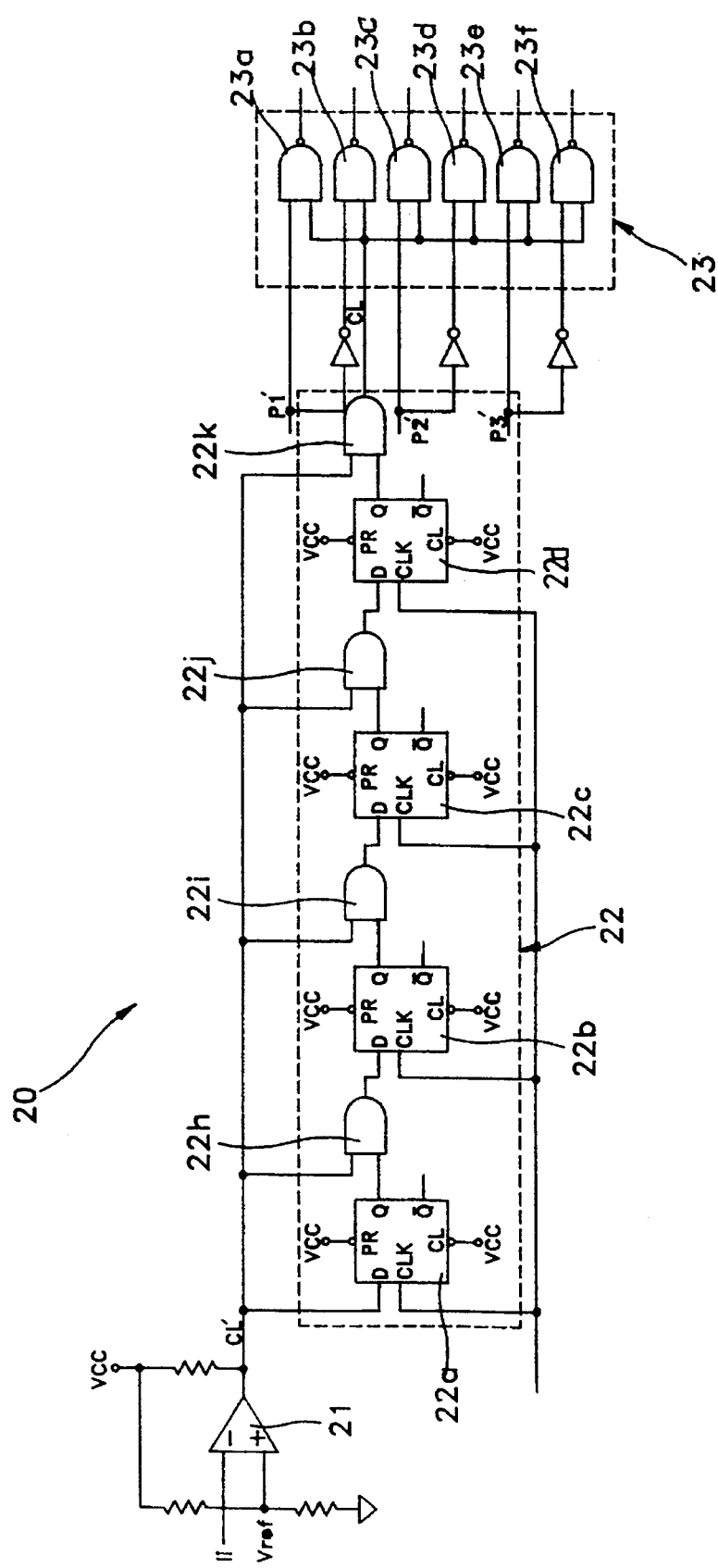
FIG. 2 is a diagram showing the structure of a current limiter of a V/F type inverter according to the present invention.

Referring to FIG. 2, in a current limiter 20 of a V/F type inverter according to the present invention, as embodied herein, a comparator 21 for comparing an output current Ii with respect to an applied voltage with a reference value to generate a current comparator output signal CL' is disposed in the front of the circuit. An ON delay circuit 22 for receiving current comparator output signal CL' and outputting a current limiting signal CL is connected to the output of comparator 21. Also, a pulse output portion 23, connected to the output of ON delay circuit 22, is provided for logically multiplying current limiting signal CL and PWM on/off pulses P1', P2' and P3' to output a predetermined pulse for driving gate drivers 31 (see FIG. 3) of a PWM inverter.

ON delay circuit 22 is composed of a combination circuit of four D latches 22a, 22b, 22c and 22d and four AND gates 22h, 22i, 22j and 22k. Also, pulse output portion 23 is composed of a combination circuit of six NAND gates 23a, 23b, 23c, 23d, 23e and 23f.

The operation of the current limiter of a V/F type inverter according to the present invention, constructed as shown above, is briefly described below with reference to FIGS. 2 to 5.

In FIG. 2, first, when a predetermined voltage for operating the motor is applied, current Ii is output according to the voltage. Output current Ii is input to comparator 21 and compared with a predetermined reference value. Then, comparator 21 outputs a predetermined current comparator output signal CL'. When output current Ii is greater than the reference value, the current comparator output signal CL' from comparator 21 is low. Current comparator output signal CL' is input to ON delay circuit 22 composed of the combination of four D latches 22a, 22b, 22c and 22d and four AND gates 22h, 22i, 22j and 22k, and delayed for a predetermined time. Thereafter, ON delay circuit 22 outputs current limiting signal CL. Current limiting signal CL is logically multiplied with PWM on/off pulses P1', P2' and P3' and input to pulse output portion 23 composed of the combination circuit of six NAND gates 23a, 23b, 23c, 23d, 23e and 23f. Then, pulse output portion 23 outputs a predetermined pulse for driving gate drivers 31 of the PWM inverter. When current limiting signal CL is low, all the pulses are likewise low so that all output switching devices are off.

Meanwhile, output current Ii is varied according to the applied voltage and load state. When output current Ii is rover reference value $V_{ref}$, output current Ii is reduced by the operation of the current limiter of the present invention, and when the current limiting is released, that is, when current limiting signal CL is high, output current Ii is again increased. When low, current limiting signal CL blocks the output pulse, to thereby reduce the current. Since four D latches are used, a current limiting time tCL of the current limiting signal CL can be expressed as $3T<tCL<4T$ where T is the input clock period of the D latches. With T thus controlled, the output can be blocked for an intended time so that the motor continuously operates without standing.

Figure 1:
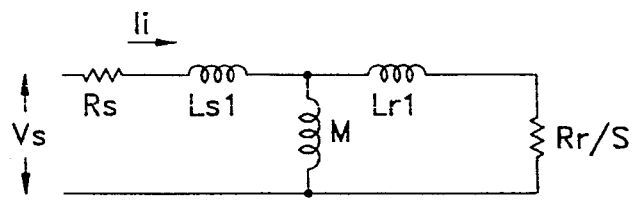
FIG. 1 is a model circuit diagram of a single phase approximated in a normal operation state, in the conventional three-phases induction motor.
Figure 3:
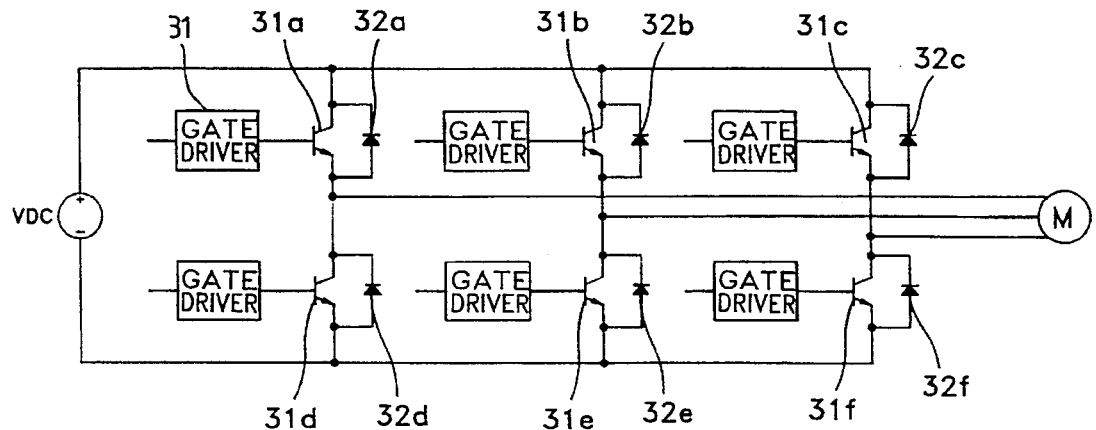
FIG. 3 is a diagram showing a basic structure of a voltage-type PWM inverter.
Figure 4:
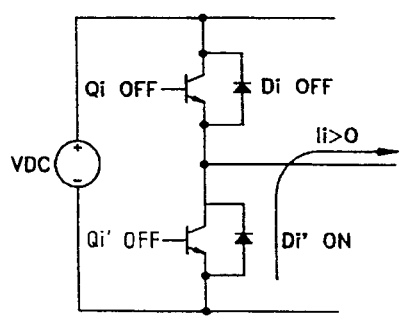
FIG. 4 is a diagram of the inverter according to the present invention showing the flow of current when the output current Ii is greater than zero and all the output switching devices are off.
Figure 5:
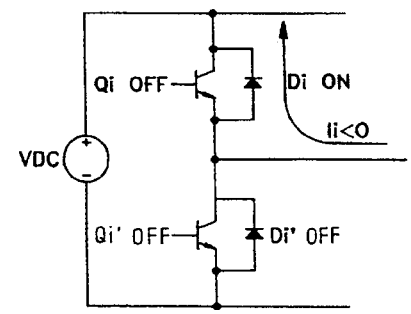
FIG. 5 is a diagram of the inverter according to the present invention showing the current flow when the output current Ii is less than zero and all the output switching devices are off.

Referring to FIGS. 3, 4 and 5, a mechanism for blocking the output for a predetermined time will be described in detail.

FIG. 3 is a diagram showing the basic structure of a voltage type PWM inverter. As shown in FIG. 3, the voltage type PWM inverter is composed of the combination of six output switching devices 31a, 31b, 31c, 31d, 31e and 31f and six freewheeling diodes 32a, 32b, 32c, 32d, 32a and 32f. The output switching devices are set to an appropriate on or off position, so that an intended voltage is applied to the motor. Here, the output switching devices are set according to various methods, and in particular, a triangular wave comparison method is used. The current limiter of the V/F inverter according to the present invention, as embodied herein, adopts this triangular wave comparison method and all output switching devices are off (open) during a predetermined time (triangular wave period).

FIGS. 4 and 5 are diagrams showing a state in which the current flows when all output switching devices are off. When currents Qi and Qi' introduced to the output switching devices are off, output current Ii flows through the freewheeling diodes in the direction in which the value of output current Ii is decreased. As shown in FIG. 4, when output current Ii is greater than zero, a diode Di is "off" and a diode Di' is "on" so that output current Ii is nearly zero. Also, as shown in FIG. 5, when output current Ii is less than zero, diode D1 is "on" and diode Di' is "off" so that output current Ii is nearly zero. Thus, when the transistor should be protected by decreasing the absolute value of the output current, all output switching devices are "off."

In the current limiter of the V/F type inverter according to the present invention, all switching devices are "off" only for a predetermined time and then an "on" or "off" pulse is again applied. Therefore, after the current is temporarily decreased, the current is increased so that the motor can be continuously operated.

As described above, in the current limiter of the V/F type inverter according to the present invention, as embodied herein, an output current is compared with a reference value by a comparator, the current value may be temporarily decreased for a predetermined time in the ON delay circuit and then an on or off pulse is applied so that the current value is increased. In this manner, the motor can be continuously operated. Also, since the peripheral systems of the induction motor do not stop, trouble during operation can be prevented and the acceleration time of the motor stopped by a sudden acceleration can be easily controlled.

The apparatus and methods described above comprise preferred embodiments of the present invention. However, it will be apparent to those skilled in the art that various modifications and variations can be made in the apparatus and methods of this invention without departing from the spirit or scope of the present invention. The present invention covers such modifications and variations which are within the scope of the appended claims and their equivalents.

What is claimed is:

1. A current limiter of a voltage/frequency type inverter, comprising:

a comparator for comparing an output current to an applied reference value to generate a current comparator output signal;

a delay circuit, coupled to said comparator, for delaying the timing of said current comparator output signal for a predetermined time duration based on the result of the comparison to generate a current limiting signal; and a pulse output circuit for outputting a predetermined pulse based on said current limiting signal.

2. The current limiter of claim 1, wherein said delay circuit includes four D latches and four AND gates.

3. The current limiter of claim 1, wherein said pulse output circuit includes six NAND gates.

4. A current limiter of a voltage/frequency type inverter, comprising:

a comparator for comparing an output current to a reference current derived from an applied voltage reference value to generate a current comparator output signal having an ON or OFF state;

a delay circuit for delaying the timing of said current comparator output signal for a predetermined time duration when said current comparator output signal changes from said OFF state to said ON state, and immediately outputting without delaying said current comparator output signal when said current comparator output signal changes from said ON state to said OFF state to generate a current limiting signal; and a pulse output circuit for outputting a predetermined pulse based on said current limiting signal.

5. The current limiter of claim 4, wherein said delay circuit includes four D latches and four AND gates.

6. The current limiter of claim 4, wherein said pulse output circuit includes six NAND gates.

7. The current limiter of claim 2, wherein the four D latches of said delay circuit are arranged in cascade to delay the current comparator output signal for at least three clock cycles.

8. The current limiter of claim 5, wherein the four D latches of said delay circuit are arranged in cascade to delay the current comparator output signal for at least three clock cycles.

9. A current limiter control, comprising:

a comparator for comparing an output current to an applied reference value to generate a current comparator output signal having a first state when the output current exceeds the applied reference value and a second state when the applied reference value exceeds the the output current;

a delay circuit, coupled to said comparator, for delaying the timing of said current comparator output signal for a predetermined time duration when the current comparator output signal transitions from the first state to the second state and for immediately outputting the current comparator output signal when the current comparator signal transitions from the second state to the first state to generate a current limiting signal;

a pulse output circuit, coupled to the delay circuit, for outputting control pulses based on the current limiting signal; and an inverter circuit, coupled to the pulse output circuit, for conducting the output current to a load in response to the control pulses.

10. The current limiter control according to claim 9, wherein the inverter circuit comprises:

output switching devices connected to conduct the output current to the load when the current comparator output signal is in the second state; and current limiting elements connected to conduct the output current to the load when the current comparator output signal is in the first state.

* * * * *